United States Patent [19]
Sadatoshi et al.

[11] Patent Number: 5,641,828
[45] Date of Patent: Jun. 24, 1997

[54] POLYPROPYLENE COMPOSITIONS AND FILM THEREOF

[75] Inventors: Hajime Sadatoshi; Seiichiro Ima; Hiroyuki Tanimura, all of Chiba, Japan

[73] Assignee: Sumitomo Chemical Company, Limited, Osaka, Japan

[21] Appl. No.: 528,612

[22] Filed: Sep. 15, 1995

Related U.S. Application Data

[63] Continuation of Ser. No. 102,821, Aug. 6, 1993, abandoned.

[30] Foreign Application Priority Data

Aug. 11, 1992 [JP] Japan .................. 4-214040

[51] Int. Cl.$^6$ .................. C08K 5/09; C08K 3/34
[52] U.S. Cl. .................. 524/451; 524/396; 524/515; 524/570
[58] Field of Search .................. 524/396, 451, 524/515, 570

[56] References Cited

U.S. PATENT DOCUMENTS 3,207,739  9/1965  Wales et al. .
5,219,913  6/1993  Tomomatsu et al. ............ 524/451
5,278,216  1/1994  Asanuma et al. ............... 524/451
5,283,267  2/1994  Nishio et al. ................... 524/451

FOREIGN PATENT DOCUMENTS

A1148588    8/1988  Australia .
0137482A3   4/1985  European Pat. Off. .
0278470A2   8/1988  European Pat. Off. .
0414202A2   2/1991  European Pat. Off. .

OTHER PUBLICATIONS

Database WPI, Derwent Publications, Ltd., London, GB, AN 82–16594E (JP–A–57 012 044) (Mitsui Toatsu) 21 Jan. 1982.
European Search Report EP 93 30 6276.

Primary Examiner—Kriellion S. Morgan
Attorney, Agent, or Firm—Sughrue, Mion, Zinn, Macpeak & Seas

[57] ABSTRACT

A polypropylene composition comprising 100 parts by weight of a crystalline propylene polymer having a molecular weight distribution (Mw/Mn) of less than 5.0 and from 0.0001 to 1.0 part by weight of a crystal nucleating agent, the composition having a crystallization temperature at least 1.5° C. higher than the crystallization temperature of the crystalline propylene polymer.

14 Claims, No Drawings

POLYPROPYLENE COMPOSITIONS AND FILM THEREOF

This is a Continuation of application Ser. No. 08/102,821, filed on Aug. 6, 1993 now abandoned.

FIELD OF THE INVENTION

The present invention relates to a polypropylene composition and a film thereof. More specifically, the invention relates to a polypropylene composition having an excellent transparency and showing a small film-forming condition dependency of the transparency, and to a film made of the polypropylene composition.

BACKGROUND OF THE INVENTION

Since a polyproylene film has excellent appearance, heat resistance, rigidity, etc., the film is widely used in a packaging field of food packaging, fiber packaging, etc.

Recently, a high-speed film formation by a large-sized film forming machine has been practiced to improve the productivity and also various thicknesses of films have been employed to widen the purposes of uses. In this case, as a result thereof, a cooling condition at film formation changes, which gives large influences on the transparency of the film formed, and a problem occurs that the transparency of the film, which is good at a low-speed film formation or in the thin films having a thickness of from about 20 to 30 μm, is greatly reduced at a high-speed film formation or in the films having a thickness of at least 50 μm.

To overcome the problem, an attempt to decrease the surface temperature of a cooling roll by decreasing the temperture of cooling water, an attempt to directly cool a molten resin extruded with water without using a cooling roll, etc., have been made and an effect has been obtained to a certain extent. However, the influences by the temperature of cooling water, the deviation of the flow rate, etc., cannot be avoided and a sufficient effect has not yet been obtained.

Thus, development of a polypropylene composition and a polypropylene film having a good transparency showing a small film-forming condition dependency and a small thickness dependency of the transparency has been desired.

A reforming method of thermally decomposing or peroxide-decomposing a polypropylene resin, a method of compounding a polypropylene resin with a sorbitol nucleating agent, etc., are known as a method of improving the transparency of a polypropylene film.

In the reforming method of decomposing a polypropylene resin, the improvement effect may be obtained at a low-speed film formation when the surface temperature of a cooling roll is low, but no effect is obtained at a high-speed film formation when the surface temperature of a cooling roll is high. Further, in the case of a high-speed film formation of thick films, the transparency is greatly reduced.

Also, in the method of compounding a sorbitol nucleating agent, the effect of improving the transparency may be obtained, but since use of the sorbitol nucleating agent causes an unpleasant odor of the film obtained, there is a restriction on the use thereof.

SUMMARY OF THE INVENTION

Accordingly, an object of the present invention is to provide a polypropylene composition and a film thereof having a good transparency and showing a small film-forming condition dependency and a small thickness dependency of the transparency without reducing the preferred characteristics the polypropylene film inherently possesses.

As a result of various investigations to develop a polypropylene composition and a film thereof having a good transparency and showing a small film-forming condition dependency and a small thickness dependency of the transparency, it has been found that the problem in the prior art can be overcome by using a polymer having a molecular weight distribution in the specific range as a crystalline propylene polymer and compounding the polymer with a specific amount of a crystal nucleating agent to obtain a polypropylene composition having a crystallization temperature higher than the crystallization temperature of the crystalline propylene polymer by at least a specific temperature. The present invention has been attained based on this finding.

That is, according to one embodiment of the present invention, there is provided a polypropylene composition comprising 100 parts by weight of a crystalline propylene polymer having a molecular weight distribution (Mw/Mn) of less than 5.0 and from 0.0001 to 1.0 part by weight of a crystal nucleating agent, the composition having a crystallization temperature at least 1.5° C. higher than the crystallization temperature of the crystalline propylene polymer.

According to another embodiment of the present invention, there is provided a polypropylene film formed by melt-extruding the above-described polypropylene composition.

DETAILED DESCRIPTION OF THE INVENTION

The present invention is described in detail below.

The crystalline propylene polymer used in the present invention has a molecular weight distribution (Mw/Mn) of less than 5.0. If the molecular weight distribution of the crystalline propylene polymer is higher than 5.0, a polypropylene composition and the film thereof having an excellent transparency and showing a small film-forming condition dependency of the transparency, which are the objects of the present invention, cannot be obtained. The molecular weight distribution is preferably 4.5 or less and more preferably 4.0 or less.

The crystalline propylene polymer used in the present invention is a crystalline propylene homopolymer or a crystalline propylene-α-olefin copolymer.

Examples of the crystalline-α-olefin copolymer are a propylene-ethylene copolymer, a propylene-butene-1 copolymer, a propylene-ethylene-butene-1 copolymer, etc., which are substantially random copolymers. A mixture thereof may be used if the molecular weight distribution thereof is less than 5.0.

Preferred crystalline propylene copolymer used in the present invention is a crystalline propylene-α-olefin copolymer having a melting point of 150° C. or less and an α-olefin content of from 2.0 to 30% by weight from the point of the improving effect of the film-forming condition of the transparency.

The crystalline propylene polymer having a melt flow rate of from 3.0 to 50 g/10 minutes is also preferable from the points of the transparency and a high speed workability.

The crystalline propylene polymer having a molecular weight distribution of less than 5.0 can be preferably produced by polymerization using a Ziegler-Natta catalyst containing Ti, Mg, and Cl as the essential components.

The crystalline propylene polymer can also be produced by a conventional method such as a method of decomposing the propylene polymer having a molecular weight distribution of at least 5.0 obtained by using the catalyst described in JP-A-47-34478 (the term "JP-A" as used herein means an "unexamined published Japanese patent application") by mixing the radical generator described in "JP-B-62-55524" (the term "JP-B" as used herein means as "examined published Japanese patent application"), or a method of thermally decomposing such the propylene polymer.

The crystal nucleating agent used in the present invention can be any crystal nucleating agents if the agent meets the requirement that by compounding 100 parts by weight of the crystalline polypropylene with from 0.0001 to 1.0 part by weight of the crystal nucleating agent, the crystallization temperature of the composition of the crystalline polypropylene compounded with the crystal nucleating agent is at least 1.5° C. higher than the crystallization temperature of the crystalline propylene polymer.

Examples of the crystal nucleating agent are an inorganic crystal nucleating agent, an organic crystal nucleating agent, a polymeric crystal nucleating agent, and the α-crystal crystal nucleating agents for propylene. Examples of the inorganic crystal nucleating agent are talc, etc.; examples of the organic crystal nucleating agent are aromatic carboxylic acid metal salts (e.g., aluminum p-tert-butylbenzoate, sodium p-tert-butylbenzoate, etc.) aromatic carboxylic acids, and aromatic phosphoric acid metal salts; and examples of the polymeric crystal nucleating agents are polymers of 3-position branched olefins having at least 5 carbon atoms (e.g., 3,3-dimethylbutene-1, 3-methylbutene-1, 3-methylpentene-1,3-methylhexene-1, and3,5,5-trimethylhexene-1) and vinylcycloalkanes (e.g., vinylcyclopentane, vinylcyclohexane, and vinylnorbornane). In these crystal nucleating agents, talc, the aromatic carboxylic acid metal salts, and the vinylcycloalkane polymers are preferably used.

The crystal nucleating agent is compounded with the crystalline propylene polymer in an amount of from 0.0001 to 1.0 part by weight per 100 parts by weight of the crystalline propylene polymer. It is important that the crystal nucleating agent is compounded such that the crystallization temperature of the composition compounded with the crystal nucleating agent is at least 1.5° C. higher ($\Delta Tc \geq 1.5°$ C.) than the crystallization temperature of the crystalline propylene polymer. Even when $\Delta Tc$ is higher than at least 1.5° C., if the amount of the crystal nucleating agent compounded is outside the above-described range defined by the present invention, the effect of the present invention is not obtained in the point of the transparency or the film-formation condition dependency and the thickness dependency of the transparency. Also, even when the amount of the crystal nucleating agent compounded is in the range defined in the present invention, if $\Delta Tc$ is lower than 1.5° C., the effect of the present invention is not similarly obtained.

The amount of the crystal nucleating agent compounded is preferably from 0.0003 to 0.5 part by weight and also $\Delta Tc$ is preferably at least 2.0° C.

The mean particle size of the crystal nucleating agent used in the present invention is preferably 6.0 μm or less, and more preferably 4.5 μm or less, from the point of deterioration of the appearance of the film due to occurrence of fish eyes.

A method of previously melt-kneading the crystalline propylene polymer with the crystal nucleating agent, a method of compounding the crystal nucleating agent with the crystalline propylene polymer and melt-kneading the mixture at the film formation, a method of compounding the master batch of the crystal nucleating agent with the crystalline propylene polymer, etc., can be used as a method for producing the polypropylene composition of the present invention, but any method that the composition within the range defined in the present invention is formed at the film formation can be used.

The polypropylene composition of the present invention can contain, if necessary, various additives conventionally used, such as an antioxidant, a neutralizing agent, a lubricant, an antiblocking agent, an antistatic agent, etc.

The polypropylene composition of the present invention is suitably used for the production of a melt-extruded product having a thickness of from 10 to 500 μm in a T-die film-forming method under the condition that the surface temperature of the cooling roll is at least 50° C., and is particularly used for the production of an unstretched film having a thickness of from 10 to 100 μm.

Also, since the polypropylene composition of the present invention has the preferred characteristics described above, the composition is suitably used as a component for at least one layer at the production of a multilayer film by a co-extrusion film-forming method.

A method of producing the polypropylene film of the present invention is not particularly limited, and can be a method which is conventionally used industrially, i.e., a method of producing a polypropylene film by a melt-extruding molding method such as a T-die film-forming method, a tubular film-forming method, etc. Of those, a T-die film-forming method wherein a high-speed film formation can be practiced by a large-size film-forming machine is preferably used.

The present invention is described in more detail by the following examples but the invention is not limited by those examples.

The measurement method of each item in the specification and the examples of the present invention was as follows.
(1) Melt Flow Rate (MFR)

MFR of the crystalline propylene polymer was measured by the method of Condition-14 according to JIS K7210.
(2) Molecular Weight Distribution (Mw/Mn)

The molecular weight distribution was measured by G.P.C. (Gel Permeation Chromatography) under the following conditions.

Machine Type: 150CV Type (manufactured by Millipore Waters Co.)

Column: Shodex M/S 80

Measurement Tempeerature: 145° C.

Solvent: Orthodichlorobenzene

Sample Concentration: 5 mg/8 ml

When Standard Reference Material 706 (polystyrene of Mw/Mn=2.1) of NBS (National Bureau of Standards) was measured under the above conditions, the molecular weight distribution (Mw/Mn) of 2.1 was obtained.
(3) Melting Temperature (Tm) and Crystallization Temperature (Tc)

After previously melting 10 mg of a test piece at 220° C. for 5 minutes in a nitrogen gas atmosphere using a differential scanning calorimeter (Type DSC-7, quenching corresponding type, trade name, made by Perkin-Elmer Co.), the temperature thereof was decreased to 40° C. at a temperature-lowering rate of 5° C./minute. In this case, the peak temperature of the maximum peak of the crystallization exothermic curve obtained was defined as the crystallization temperature (Tc).

Thereater, the temperature was increased at a rate of 5° C./minute and the peak temperature of the maximum peak of the melting endothermic curve obtained was defined as the melting point (Tm).

In addition, the melting point of indium (In) measured at a temperature-increasing rate of 5° C./minute using the measurement machine described above was 156.6° C.

(4) Ethylene Content and Butene-1 Content

Ethylene Content: The ethylene content was determined by the IR spectral method described in *Kohbunshi Bunseki (Polymer Analysis) Handbook*, page 256 [(i) Random Copolymer], published by Asakura Shoten, 1985.

Butene-1 Content: The butene-1 content was determined by the IR spectral method.

Butene-1 content (weight %)=1.208K' wherein K' is an absorbance at 767 $cm^{-1}$.

(5) Transparency (haze)

Measured according to JIS K7105.

REFERENCE EXAMPLE 1

(a) Synthesis of Organomagnesium Compound

After replacing the inside atmosphere of a one liter flask equipped with a stirrer, a reflux condenser, a dropping funnel, and a thermometer with argon, 32.0 g of a shaved-form magnesium for a Grignard reagent was placed in the flask. Then, 120 g of butyl chloride and 500 ml of dibutyl ether were charged in the dropping funnel and about 30 ml of the mixture was dropped onto magnesium in the flask to initiate the reaction. After the initiation of the reaction, dropping of the mixture was continued at 50° C. for 4 hours and thereafter, the reaction was further continued at 60° C. for one hour. Thereafter, the reaction mixture was cooled to room temperature and solid components were filtered off.

When butylmagnesium chloride in dibutyl ether was hydrolyzed with 1N sulfuric acid and the concentration was determined by back-titration with an aqueous solution of 1N sodium hydroxide using phenolphthalein as the indicator, the concentration was 2.1 mols/liter.

(b) Synthesis of Solid Product

After replacing the inside atmosphere of a 500 ml flask equipped with a stirrer and a dropping funnel with argon, 240 ml of hexane, 5.4 g (15.8 mmols) of tetrabutoxytitanium, and 61.4 g (295 mmols) of tetraethoxysilane were placed in the flask to form a homogeneous solution. Then, 150 ml of the organomagnesium compound synthesized in the above step (a) was gradually added dropwise to the mixture from the dropping funnel over a period of 4 hours while keeping the temperature of the inside of the flask at 5° C. Thereafter, the resulting mixture was further stirred at room temperature for one hour and solids formed were separated from liquid at room temperature, repeatedly washed 3 times with 240 ml of hexane and dried at reduced pressure to obtain 45.0 g of a light-brown solid product.

The solid product obtained contained 1.7% by weight of a titanium atom, 33.8% by weight of an ethoxy group, and 2.9% by weight of a butoxy group.

Also, in the wide angle X-ray diffraction diagram of the solid product by the Cu-Ka line, no clear diffraction peaks were observed, which showed that the product had a non-crystalline structure.

(c) Synthesis of Ester-Treated Solid

After replacing the inside atmosphere of 100 ml flask with argon, 6.5 g of the solid product synthesized in the above step (b), 16.2 ml of toluene, and 4.3 ml (16 mmols) of diisobutyl phthalate were placed in the flask and the reaction was carried out at 95° C. for one hour.

After the reaction, solids formed were separated from liquid and washed 3 times with 33 ml of toluene.

(d) Synthesis of Solid Catalyst (activation treatment)

After finishing washing in the above step (c), 16.2 ml of toluene, 0.36 ml (1.3 mmols) of diisobutyl phthalate, 2.2 ml (13 mmols) of dibutyl ether, and 38.0 ml (346 mmols) of titanium tetrachloride were added to the solids in the flask and the reaction was carried out at 95° C. for 3 hours. After finishing the reaction, solids formed were separated from liquid at 95° C. and washed twice with 33 ml of toluene at the same temperature. Then, the above washing treatment with the mixture of diisobutyl phthalate, dibutyl ether, and titanium tetrachloride was repeated once more under the same condition and the solid product was washed 3 times with 33 ml of hexane to obtain 5.0 g of a loess-color solid catalyst.

The solid catalyst contained 2.1% by weight of a titanium atom, 19.9% by weight of a magnesium atom, and 12.7% by weight of a phthalic acid ester.

REFERENCE EXAMPLE 2

Preparation of Solid Catalyst (a) Synthesis of Solid Product

After replacing the inside atmosphere of a 5 liter flask equipped with a stirrer and a dropping funnel with argon, 1,100 ml of n-heptane and 670 ml of tetra-n-butoxytitanium were placed in the flask and the temperature in the flask was kept at 35° C. Then, a solution of 1,080 ml of n-heptane and 445 ml of ethylaluminum sesquichloride was gradually added dropwise to the mixture from the dropping funnel over a period of 2 hours while keeping the temperature of the system at 35° C. Thereafter, the temperature was raised to 60° C. and the mixture was stirred for one hour. Then, the reaction mixture was allowed to stand at room temperature, solids formed were separated from liquid, and after repeatedly washing with 1,000 ml of n-heptane 4 times, the solids were dried under a reduced pressure to obtain a red-brown solid product.

The solid product contained 5.2 mmols of titanium and 7.0 mm of a n-butoxy group in one gram thereof.

(b) Synthesis of Solid Catalyst Component

After replacing the inside atmosphere of a one liter flask with argon, 54 g of the solid product obtained in the above step (a) and 270 ml of n-heptane were placed in the flask and the temperature in the flast was kept at 65° C. Then, 48 ml of di-n-butyl ether and 156 ml of titanium tetrachloride were added thereto and the reaction was carried out at 65° C. for one hours. The reaction mixture obtained was allowed to stand at room temperature, solids formed were separated from liquid, and after repeatedly washing with 500 ml of n-heptane 4 times, the solids were dried under a reduced pressure to obtain a solid catalyst component (a).

Then, 600 ml of dehydrated and purified n-heptane, 16.5 mmols of diethylaluminum chloride, and 50 g of the solid catalyst component (a) obtained above were successively added into a one liter glass flask and after raising the temperature thereof to 60° C., while pressing the inside pressure of the flask to 200 mm Hg with propylene, the polymerization was carried out until the amount of propylene supplied became 40 g. Then, 170 ml of vinylcyclohexane was supplied to the reaction mixture over a period of one hour and the polymerization was further continued for 2 hours. The solid catalyst containining the polymers of propylene and vinylcyclohexane obtained was washed wih dehyrated and purified n-heptane and dried to obtain 222 g of a solid catalyst (b) containing 40 g of a propylene polymer unit and 132 g of a vinylcyclohexane polymer unit.

Production of Vinylcyclohexane Polymer Composition

Into a 0.33 m³ reaction vessel equipped with a stirrer made of SUS, the inside pressure of which was adjusted to 0.5 kg/cm² gauge at 35° C. with propylene, were successively added 0.16 m³ of n-heptane, 1.2 mols of diethylaluminum chloride and 0.1 mol of methyl methacrylate. After adding thereto 150 g of the solid catalyst (b) prepared above, 20 kg of propylene, and 75 liters of hydrogen, the temperature thereof was raised to 60° C., and the polymerization was initiated. Propylene was supplied such that the polymerization pressure was maintained at 6 kg/cm² gauge and the polymerization was continued by supplying hydrogen such that the concentration of the vapor phase was kept at 6% by volume and when the total supplied amount of propylene became 28 kg, the polymerization was finished.

The polymer slurry obtained was immediately introduced into a post treatment bath, and after stopping the polymerizatation with BuOH and washing the slurry with water at 60° C. for 3 hours, solids formed were separated from liquid to obtain 8.5 g of a vinylcyclohexane polymer composition. The content of the vinylcyclohexane polymer in the composition was 0.05% by weight.

EXAMPLE 1

(a) Catalyst Component

In a 250 liter reaction vessel equipped with a stirrer was placed 150 liters of sufficiently purified hexane and after sufficiently replacing the inside atmosphere in the system with a nitrogen gas, and 3.2 mols of triethylaluminum (hereinafter referred to as "TEA"), 0.32 mols of cyclohexylethyldimethoxysilane (hereinafter referred to as "CHEDMS"), and the solid catalyst obtained in Reference Example 1 in an amount of 51.8 g calculated as Ti atom were added into the reaction vessel. While keeping the temperature of the system at 25° C., 2.8 kg of propylene was continuously added thereto over a period of 2 hours.

(b) Polymerization

Using three polymerization baths each having an inside volume of from 20 to 45 m³, the catalyst component prepared in the above step (a) was supplied thereto such that the polymerization temperature became 75° C., the polymerization pressure became 20 kg/cm²G, and the average residence time became 6 hours and while simultaneously supplying thereto TEA and CHEDMS, a vapor-phase polymerization was carried out by continuously supplying propylene and hydrogen such that the H₂ concentration in the vapor-phase portion became 0.7%.

The polymer obtained had a melt flow rate (230° C.) of 11.0 g/10 minutes, a molecular weight distribution (Mw/Mn) was 4.0, and the crystallization temperature (Tc) was 115.7° C.

After compounding 100 parts by weight of the crystalline propylene polymer thus obtained with 0.2 part by weight of talc (having a mean particle size of 2.2 µm, made by Nippon Talc K.K.), 0.05 part by weight of calcium stearate, 0.1 part by weight of Sumilizer BHT (trade name, made by Sumitomo Chemical Company, Limited) and 0.05 part by weight of Irganox 1010 (trade name, made by Ciba-Geigy AG) were added to the above mixture. After mixing the resulting mixture with a Henschel mixer, the mixture was melt-extruded to form pellets. The pellets obtained were melt-extruded by a T-die film-forming machine having a diameter of 50 mm at a die temperature of 250° C. and cooled by a cooling roll to obtain an unstretched film.

In this case, the temperature of cooling water supplied to the cooling roll was changed to practice cooling at the levels of 30° C. and 70° C. Thus, when the temoerature of cooling water was 30° C., an unstretched film having a thickness of 30 µm was obtained and when the temperature of cooling water was 70° C., unstetched films having a thickness of 30 µm and 70 µm, respectively, were obtained. In this case, the surface temperatures of the cooling roll were 30° C. and 66° C., respectively.

COMPARATIVE EXAMPLE 1

By following the same procedure as in Example 1 using the crystalline propylene polymer except that talc was not compounded, a film was prepared and evaluated as in Example 1. The evaluation results are shown in Table 1 below.

COMPARATIVE EXAMPLES 2 and 3

By using a 23 liter polymerization bath equipped with a stirrer, propylene was continuously polymerized using the solid catalyst described in JP-A-47-34478, in the co-presence of diethylaluminum chloride, an electron donor, and hydrogen, using heptane as a solvent, at a polymerization temperature of 60° C., a polymerization pressure of 6 kg/cm² G, and a vapor-phase hydrogen concentration of 2.9%.

The polymer obtained had a melt flow rate of 12.0 g/10 minutes, a molecular weight distribution (Mw/Mn) of 6.1, and a crystallization temperature (Tc) of 116.2° C.

By using the crystalline propylene polymer thus obtained, the same procedures as in Example 1 and Comparative Example 1 were followed and films obtained were evaluated as in Example 1. The evaluation results are shown in Table 1 below.

TABLE 1

| | Crystalline Propylene Composition | | | | | Crystal Nucleating Agent | | Polypropylene Composition | |
| | | α-Olefin content | | | | | Amount | | |
| | Mw/Mn | Ethylene (wt %) | Butene-1 (wt %) | Tm (°C.) | Tc (°C.) | Kind | (Parts by weight) | Tc (°C.) | ΔTc (°C.) |
| --- | --- | --- | --- | --- | --- | --- | --- | --- | --- |
| Example 1 | 4.0 | 0 | 0 | 163.9 | 115.7 | Talc | 0.2 | 127.7 | 12.0 |
| Comparative Example 1 | 4.0 | 0 | 0 | 163.9 | 115.7 | — | — | 115.7 | 0.0 |
| Comparative | 6.1 | 0 | 0 | 161.2 | 116.2 | Talc | 0.2 | 124.0 | 8.3 |

TABLE 1-continued

| | | | | | | | | |
|---|---|---|---|---|---|---|---|---|
| Example 2 Comparative Example 3 | 6.1 | 0 | 0 | 161.2 | 116.2 | — | — | 116.2 | 0.0 |

| | Transparency (Haze) (%) | | |
|---|---|---|---|
| | Cooling Roll Water Temp.: 30° C. Film thickness | Cooling Roll Water Temp.: 70° C. Film thickness | |
| | 30 μm | 30 μm | 70 μm |
| Example 1 | 3.7 | 5.3 | 5.9 |
| Comparative Example 1 | 0.7 | 11.1 | 27 |
| Comparative Example 2 | 4.4 | 7.4 | 9.2 |
| Comparative Example 3 | 2.5 | 11.3 | 21 |

As is clear from the results shown in Table 1, it can be seen that in the unstretched films obtained by using the compositions of the present invention, the transparency of the films is stable at a good level in the cooling roll temperature range of from a low-temperature range to a high-temperature range and also in the range of the film thickness of from the range of a thin film to the range of a relatively thick film.

EXAMPLE 2

By using the same catalyst system and polymerization method as in Example 1, a mixed system of propylene, ethylene, butene-1 was subjected a vapor-phase continuous polymerization at a polymerization temperature of 80° C., a polymerization pressure of from 7 to 15 kg/cm² G, and a H₂ concentration of 0.25%. Thus, a propylene-ethylene-butene-1 random copolymer having an ethylene content of 1.2% by weight and a butene-1 content of 10.2% by weight was obtained as a crystalline propylene copolymer. The copolymer obtained had a melt flow rate of 5.7 g/10 minutes, a molecular weight distribtion of 3.0 and a crystallization temperature of 99.3° C.

After compounding 100 parts by weight of the copolymer with 0.05 part by weight of talc (mean particle size 1.9 μm, made by Nippon Talc K.K.), 0.05 part by weight of calcium stearate, 0.15 part by weight of Irganox 1010 (trade name, made by Ciba-Geigy AG), 0.05 part by weight of Sandostab P-EPQ (trade name, made by Sandoz), 0.1 part by weight of erucic acid amide, and 0.15 part by weight of a fine silica powder (mean particle size 2.73 μm, Syloid 55, trade name, made by Fuji Davison Chemical Ltd.), a film was prepared in the same manner as in Example 1 and evaluated as in Example 1. The evaluation results are shown in Table 2 below.

COMPARATIVE EXAMPLE 4

By following the same procedure as in Example 2 using the same crystalline propylene polymer as in Example 2 except that talc was not compounded, a film was prepared and evaluated as in Example 2. The evaluation results are shown in Table 2.

EXAMPLES 3 to 6

By following the same procedure as in Example 2 using the same crystalline propylene polymer as in Example 2 while changing the kind or the amount of the crystal nucleating agent used as shown in Table 2 below, each of the films was prepared and evaluated as in Example 2. The evaluation results of these films are shown in Table 2 below.

In addition, the crystal nucleating agents used in these examples are as follows.

Example 3: Talc, mean particle size 2.2 μm, made by Nippon Talc K.K.

Example 4: Talc, mean particle size 4.5 μm, made by Nippon Talc K.K.

Example 5: PTBBA A1 #500, trade name, made by Dainippon Ink And Chemicals, Inc., mean particle size 4.5 μm Example 6: Vinylcyclohexane Polymer Composition obtained in Reference Example 2, mean particle size 1 μm or less COMPARATIVE EXAMPLES 5 to 9

By following the same procedure as Example 2 using the same crystalline propylene polymer as in Example 2 while changing the kind or the amount of the crystal nucleating agent used as shown in Table 3 below, each of films was prepared and evaluated as in Example 2. The evaluation results are shown in Table 3 below.

In addition, the crystal nucleating agents used in these comparative examples were as follows.

Comparative Examples 5 and 6: Talc, mean particle size 2.2 μm, made by Nippon Talc K.K.

Comparative Example 7: Vinylcyclohexane polymer composition obtained in Reference Example 2, mean particle size less than 1 μm Comparative Example 8: Softon SS-1800, made by Bihoku Funka Kogyo K.K., mean particle size 1.3 μm Comparative Example 9: Kisuma 5B, trade name, made by Kyowa Hakko Kagaku Co., Ltd., mean particle size 0.8 μm

COMPARATIVE EXAMPLE 10

By the same polymerization method as in Comparative Example 2, a mixed system of propylene and butene-1 was continuously polymerized at a polymerization temperature of 50° C., a polymerization pressure of 5 kg/cm² G, and a vapor-phase hydrogen concentration of 4.5% to obtain a propylene-ethylene-butene-1 random copolymer having an ethylene content of 2.1% by weight, a butene-1 content of 4.2% by weight, a melt flow rate of 3.9 g/10 minutes, and a molecular weight distribution of 5.2.

After compounding 100 parts by weight of the random copolymer with 0.2 part by weight of talc (mean particle size 2.2 μm), 0.05 part by weight of calcium stearate, 0.15 parts by weight of Irganox, 0.05 part by weight of Sandostab P-EPQ, 0.1 part by weight of erucic acid amide, and 0.15 part by weight of a fine silica powder, a film was prepared in the same manner as in Example 1 and evaluated as in Example 1. The evaluation results are shown in Table 3 below.

COMPARATIVE EXAMPLE 11

By following the same procedure as in Comparative Example 10 using the random copolymer obtained in Comparative Example 10 except that talc was not added, a film was prepared and evaluated as in Comparative Example 10. The evaluation results are shown in Table 3.

TABLE 2

| | Crystalline Propylene Composition | | | | | Crystal Nucleating Agent | | Polypropylene Composition | |
|---|---|---|---|---|---|---|---|---|---|
| | | α-Olefin content | | | | | Amount | | |
| | Mw/Mn | Ethylene (wt %) | Butene-1 (wt %) | Tm (°C.) | Tc (°C.) | Kind | (Parts by weight) | Tc (°C.) | ΔTc (°C.) |
| Example 2 | 3.0 | 1.2 | 10.2 | 138.0 | 99.3 | Talc | 0.05 | 102.2 | 2.9 |
| Comparative Example 4 | 3.0 | 1.2 | 10.2 | 138.0 | 99.3 | — | — | 99.3 | 0.0 |
| Example 3 | 3.0 | 1.2 | 10.2 | 138.0 | 99.3 | Talc | 0.4 | 104.8 | 5.5 |
| Example 4 | 3.0 | 1.2 | 10.2 | 138.0 | 99.3 | Talc | 0.2 | 103.7 | 4.4 |
| Example 5 | 3.0 | 1.2 | 10.2 | 138.0 | 99.3 | Aluminum p-tert-butylbenzoate | 0.2 | 113.8 | 14.5 |
| Example 6 | 3.0 | 1.2 | 10.2 | 138.0 | 99.3 | Vinylcyclohexane polymer | 0.0005 | 112.0 | 12.7 |

| | Transparency (Haze) (%) | | |
|---|---|---|---|
| | Cooling Roll Water Temp.: 30° C. Film thickness | Cooling Roll Water Temp.: 70° C. Film thickness | |
| | 30 μm | 30 μm | 70 μm |
| Example 2 | 1.4 | 3.3 | 3.8 |
| Comparative Example 4 | 1.1 | 7.1 | 11.8 |
| Example 3 | 3.0 | 3.9 | 4.4 |
| Example 4 | 2.0 | 3.1 | 3.3 |
| Example 5 | 3.3 | 4.2 | 5.0 |
| Example 6 | 1.2 | 4.0 | 4.6 |

TABLE 3

| | Crystalline Propylene Composition | | | | | Crystal Nucleating Agent | | Polypropylene Composition | |
|---|---|---|---|---|---|---|---|---|---|
| | | α-Olefin content | | | | | Amount | | |
| | Mw/Mn | Ethylene (wt %) | Butene-1 (wt %) | Tm (°C.) | Tc (°C.) | Kind | (Parts by weight) | Tc (°C.) | ΔTc (°C.) |
| Comparative Example 5 | 3.0 | 1.2 | 10.2 | 138.0 | 99.3 | Talc | 0.001 | 100.2 | 0.9 |
| Comparative Example 6 | 3.0 | 1.2 | 10.2 | 138.0 | 99.3 | Talc | 2.0 | 105.5 | 6.2 |
| Comparative Example 7 | 3.0 | 1.2 | 10.2 | 138.0 | 99.3 | Vinyl cyclohexane polymer | 0.00001 | 105.1 | 5.8 |
| Comparative Example 8 | 3.0 | 1.2 | 10.2 | 138.0 | 99.3 | Calcium sulfate | 0.2 | 99.8 | 0.5 |
| Comparative Example 9 | 3.0 | 1.2 | 10.2 | 138.0 | 99.3 | Magnesium Hydroxide | 0.2 | 99.3 | 0.0 |

TABLE 3-continued

| | | | | | | | | | |
|---|---|---|---|---|---|---|---|---|---|
| Comparative Example 10 | 5.2 | 2.1 | 4.2 | 139.1 | 99.0 | Talc | 0.2 | 107.4 | 8.4 |
| Comparative Example 11 | 5.2 | 2.1 | 4.2 | 139.1 | 99.0 | — | — | 99.0 | 0.0 |

| | Transparency (Haze) (%) | | |
|---|---|---|---|
| | Cooling Roll Water Temp.: 30° C. Film thickness | Cooling Roll Water Temp.: 70° C. Film thickness | |
| | 30 μm | 30 μm | 70 μm |
| Comparative Example 5 | 1.1 | 6.5 | 7.9 |
| Comparative Example 6 | 15.2 | 16.8 | 17.4 |
| Comparative Example 7 | 1.2 | 7.5 | 10.9 |
| Comparative Example 8 | 3.1 | 9.0 | 13.4 |
| Comparative Example 9 | 1.4 | 7.5 | 10.5 |
| Comparative Example 10 | 6.8 | 9.1 | 10.4 |
| Comparative Example 11 | 5.7 | 7.8 | 15.2 |

As described above, by using the polypropylene composition of the present invention, a film having a good transparency and a very small film-forming condition dependency and a very small thickness dependency of the transparency can be obtained without reducing the preferred characteristics the polypropylene film inherently possesses and the film can be suitably used for a high-speed film formation by a melt extrusion.

While the invention has been described in detail and with reference to specific embodiments thereof, it will be apparent to one skilled in the art that various changes and modifications can be made therein without departing from the spirits and scope thereof.

What is claimed is:

1. A polypropylene composition consisting essentially of 100 parts by weight of a crystalline propylene polymer produced by polymerization using a Ziegler-Natta catalyst containing Ti, Mg and Cl as the essential components and having a molecular weight distribution (Mw/Mn) of less than 5.0 and from 0.001 to 1.0 part by weight of a crystal nucleating agent, the composition having a crystallization temperature at least 1.5° C. higher than the crystallization temperature of the crystalline propylene polymer.

2. A polypropylene composition as claimed in claim 1, wherein the crystalline propylene polymer has the melt flow rate of from 3.0 to 50 g/10 minutes.

3. A polypropylene composition as claimed in claim 1, wherein the crystalline propylene polymer is a crystalline propylene homopolymer or a crystalline propylene-α-olefin copolymer.

4. A polypropylene composition as claimed in claim 3, wherein the crystalline propylene-α-olefin copolymer is a propylene-ethylene copolymer, a propylene-butene-1 copolymer or a propylene-ethylene-butene-1 copolymer.

5. A polypropylene composition as claimed in claim 3, wherein the crystalline propylene-α-olefin copolymer has an α-olefin content of from 2.0 to 30% by weight.

6. A polypropylene composition as claimed in claim 1, wherein the crystalline propylene polymer has the molecular weight distribution of 4.5 or less.

7. A polypropylene composition as claimed in claim 1, wherein the crystalline propylene polymer has the molecular weight distribution of 4.0 or less.

8. A polypropylene composition as claimed in claim 1, wherein the crystal nucleating agent is an inorganic crystal nucleating, an organic crystal nucleating agent, a polymeric crystal nucleating agent, or α-crystal crystal nucleating agents for propylene.

9. A polypropylene composition as claimed in claim 1, wherein the crystal nucleating agent is talc, an aromatic carboxylic acid metal salt or a vinyl cycloalkane polymer.

10. A polypropylene composition as claimed in claim 1, wherein the amount of the crystal nucleating agent is from 0.0003 to 0.5 part by weight.

11. A polypropylene composition as claimed in claim 1, wherein the crystal nucleating agent has a mean particle size of 6.0 μm or less.

12. A polypropylene composition as claimed in claim 1, wherein the crystal nucleating agent has a mean particle size of 4.5 μm or less.

13. A polypropylene composition as claimed in claim 1, having a crystallization temperature at least 2.0° C. higher than the crystallization temperature of the crystalline propylene polymer.

14. A polypropylene film obtained by melt-extruding the polypropylene composition as claimed in claim 1.

* * * * *